United States Patent
Lee et al.

(10) Patent No.: US 10,516,921 B1
(45) Date of Patent: Dec. 24, 2019

(54) OPTICAL LINE TERMINAL FOR PROVIDING MANAGEMENT FUNCTION EMULATING VIRTUAL CHASSIS SWITCH FOR FIBER LOCAL AREA NETWORK SYSTEM

(71) Applicant: DASAN Zhone Solutions, Inc., Oakland, CA (US)

(72) Inventors: Seung Dong Lee, Fremont, CA (US); Kyoung Soo Kim, Seongnam-si (KR)

(73) Assignee: DASAN ZHONE SOLUTIONS, INC., Oakland, CA (US)

( * ) Notice: Subject to any disclaimer, the term of this patent is extended or adjusted under 35 U.S.C. 154(b) by 0 days.

(21) Appl. No.: 15/993,647

(22) Filed: May 31, 2018

(51) Int. Cl.
*H04B 10/27* (2013.01)
*H04Q 11/00* (2006.01)
*H04B 10/25* (2013.01)

(52) U.S. Cl.
CPC ......... *H04Q 11/0005* (2013.01); *H04B 10/25* (2013.01); *H04B 10/27* (2013.01)

(58) Field of Classification Search
CPC ..... H04B 10/25; H04B 10/27; H04Q 11/0005
See application file for complete search history.

(56) References Cited

U.S. PATENT DOCUMENTS

| | | | |
|---|---|---|---|
| 6,567,403 B1 * | 5/2003 | Congdon | H04L 12/44 370/389 |
| 8,406,627 B2 | 3/2013 | Nors | |
| 2005/0002390 A1 * | 1/2005 | Kim | H04L 49/351 370/389 |
| 2009/0154471 A1 * | 6/2009 | Kim | H04L 12/2856 370/395.53 |
| 2016/0077841 A1 * | 3/2016 | Lambert | G06F 13/4022 713/2 |
| 2019/0028573 A1 * | 1/2019 | Cook | H04L 69/16 |

\* cited by examiner

*Primary Examiner* — Dzung D Tran

(57) ABSTRACT

Disclosed is a new advance in a network management function of an optical time terminal (OLT). A virtual switch management program is running on the disclosed OLT. The virtual switch management program provides a switch management environment for a single chassis-based Ethernet switch with a plurality of port extender cards corresponding to the optical network terminals and being mounted thereon through a management terminal. The virtual switch management program receives a switch management command for each port extender through the management terminal and outputs a fiber LAN management command corresponding to the switch management command to an optical network terminal corresponding to each port extender.

17 Claims, 7 Drawing Sheets

OPTICAL LINE TERMINAL FOR PROVIDING MANAGEMENT FUNCTION EMULATING VIRTUAL CHASSIS SWITCH FOR FIBER LOCAL AREA NETWORK SYSTEM

BACKGROUND

1. Field

Embodiments of the present disclosure relate to a new development in a network management function of a fiber local area network (LAN) system, and more particularly, to an optical line terminal (OLT).

2. Discussion of Related Art

U.S. Pat. No. 6,567,403, published on May 20, 2003, proposes a single virtual chassis switch network topology. Virtual chassis technology allows for managing of switches connected to one another in a tree structure, like a switch having one expandable port.

In place of such copper LAN, optical LAN technology is being increasingly employed. U.S. Pat. No. 8,406,627, published on May 26, 2013, discloses a technique for stacking an optical network terminal (ONT) connected to an optical line terminal (OLT). An ONT management and control interface (OMCI) protocol, which is a standard management protocol of a passive optical network (PON) includes a data model that describes elements associated with a chassis-based ONT, for example, a cardholder, a circuit pack, and a port mapping package-G. A cardholder managed entity defines a slot of a chassis into which and with which a cardholder, that is, a circuit card, is to be inserted and to be equipped. A circuit pack managed entity defines a circuit pack to be inserted into the cardholder, and the port mapping package defines ports or a user network interface (UNI).

U.S. Pat. No. 8,406,627 proposes a modular ONT in which the second ONT, the third ONT, and the like may be stacked on a master ONT. The master ONT senses a newly connected ONT, reports the sensed ONT to an OLT, allocates an available temporary virtual cardholder to the new ONT, and generates a new circuit pack managed entity in which a new ONT is modeled. These ONTs appear as virtual chassis-based ONTs over the OMCI protocol.

Network managers already familiarized with copper LANs have difficulties in managing of optical LAN composed of optical line terminals (OLTs) connected to a plurality of optical network terminals (ONTs) over a passive optical network (PON) due to different standards and management types.

SUMMARY

The proposed invention is directed to enabling a network manager to manage an optical LAN in a similar way to that of a copper LAN.

Furthermore, the proposed invention is directed to enabling a network manager to manage, like a single virtual switch, an optical communication network apparatus composed of an optical line terminal (OLT) and a plurality of optical network terminals (ONTs) connected to the OLT over a passive optical network.

In addition, the proposed invention is directed to simplifying the configuration of the ONT and facilitating addition of a new function by implementing functions of a conventional ONT in an OLT.

According to an aspect, a virtual switch management program is run on an optical line terminal. The virtual switch management program provides a switch management environment for a single chassis-based Ethernet switch on which a plurality of port extender cards corresponding to optical network terminals are mounted, through a management terminal. The virtual switch management program receives a switch management command for each port extender through the management terminal and processes a corresponding fiber LAN management command.

According to another aspect, the virtual switch management program may include a management environment emulating unit and a management command processing unit. The management environment emulating unit may provide a switch management environment for a single chassis-based Ethernet switch on which a plurality of port extender cards corresponding to the optical network terminals are mounted according to fiber LAN modeling data and may receive a switch management command for each of the port extenders. The management command processing unit may process a fiber LAN management command corresponding to a physical optical LAN device according to the received switch management command.

According to an additional aspect, the fiber LAN modeling data may include optical information including optical LAN connectivity information and optical line information and configuration information including serial numbers of the port extenders and the number of ports.

According to an additional aspect, the management command processing unit may include an extender card control unit configured to specify an optical network terminal on the basis of the fiber LAN modeling data and parameters included in the switch management command and execute a fiber LAN management command corresponding to the switch management command.

According to another additional aspect, the management command processing unit may include a chassis control unit configured to specify an optical line terminal or an optical network terminal on the basis of the fiber LAN modeling data and parameters included in the switch management command and execute a fiber LAN management command corresponding to the switch management command.

According to an additional aspect, the management command processing unit may include a plurality of management and control interface modules and a plurality of port extender plug-in modules. The plurality of management and control interface modules may be interfaced with the optical network terminals to output a management and control command according to their respective interface types. The plurality of port extender plug-in modules specify an optical network terminal on the basis of the fiber LAN modeling data and parameters included in the switch management command and output a corresponding fiber LAN management command through a management and control interface corresponding to a control interface type of the optical network terminal.

According to an additional aspect, the management command processing unit may include a chassis control plug-in module configured to specify an output port of the optical line terminal on the basis of the fiber LAN modeling data and the parameters included in the switch management command and execute a corresponding fiber LAN management command.

According to an additional aspect, management data may include state information of the port extenders.

According to an additional aspect, the virtual switch management program may further include a plug-and-play processing unit configured to, when a new optical network terminal is connected to an optical line, detect the new optical network terminal through the management and control interface module and generate a fiber LAN data model of a new port extender having the same number of ports as that of the connected ONT in the fiber LAN data model. Additionally, the plug-and-play processing unit may set state information of the new port extender to an auto-provisioned mode.

According to an additional aspect, the virtual switch management program may further include a loop detection unit configured to detect whether a loop is present in a network of the connected optical network terminals and transmit a warning message. According to an additional aspect, the management environment emulating unit may further include a state information management unit configured to change or inquire about state information of the port extenders with reference to switch state data according to the switch management command.

According to an additional aspect, the management environment emulating unit may further include a pre-configuration unit configured to generate a fiber LAN data model of a new port extender according to port interface information (UNI interface) received from a manager and set the state information to a pinned mode.

According to an additional aspect, the management environment emulating unit may further include a port extender renaming unit configured to change a name in a fiber LAN data model of a port extender according to an input from a manager.

According to an additional aspect, the management environment emulating unit may further include a device replacement unit configured to change a device serial number of a port extender according to an input from a manager but to maintain port interface information of the port extender.

According to an additional aspect, the management environment emulating unit may further include a chassis management unit configured to receive a switch management command for a switch chassis and make an instruction to output a fiber LAN management command to a corresponding port of the optical line terminal.

According to an additional aspect, the state information of the port extenders may include a black-listed mode, and the management environment emulating unit may allow only limited processing of a port extender being in the black-listed mode other than port extenders being in other states.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

The above or other aspects will be implemented through embodiments described with reference to the accompanying drawings. It is to be understood that the components of each embodiment may be variously combined therein unless otherwise stated or mutually contradictory. That is, although each drawing is shown as one embodiment, it should not be understood as being limited to one embodiment. As will be described in separate optional or additional aspects, it is to be understood that one or more unessential blocks are combined to essential blocks to represent a variety of embodiments.

In the illustrated block diagram, each block may refer to a set of consecutive or nonconsecutive instructions in program code running on a processor. As another example, each block may refer to a set of consecutive or nonconsecutive instructions in programs residing on a general-purpose processor or a signal processing integrated circuit. As another example, each block may refer to an integrated set of consecutive or nonconsecutive instructions in programs residing on a general-purpose processor or a part of an application specific integrated circuit. It is understood by those skilled in the art that electronic circuits and programs in designing functions are merely design choices. In this regard, the term "management program" used herein should be construed as covering functional elements embodied in such hardware, program code, or a combination thereof.

Figure 1:
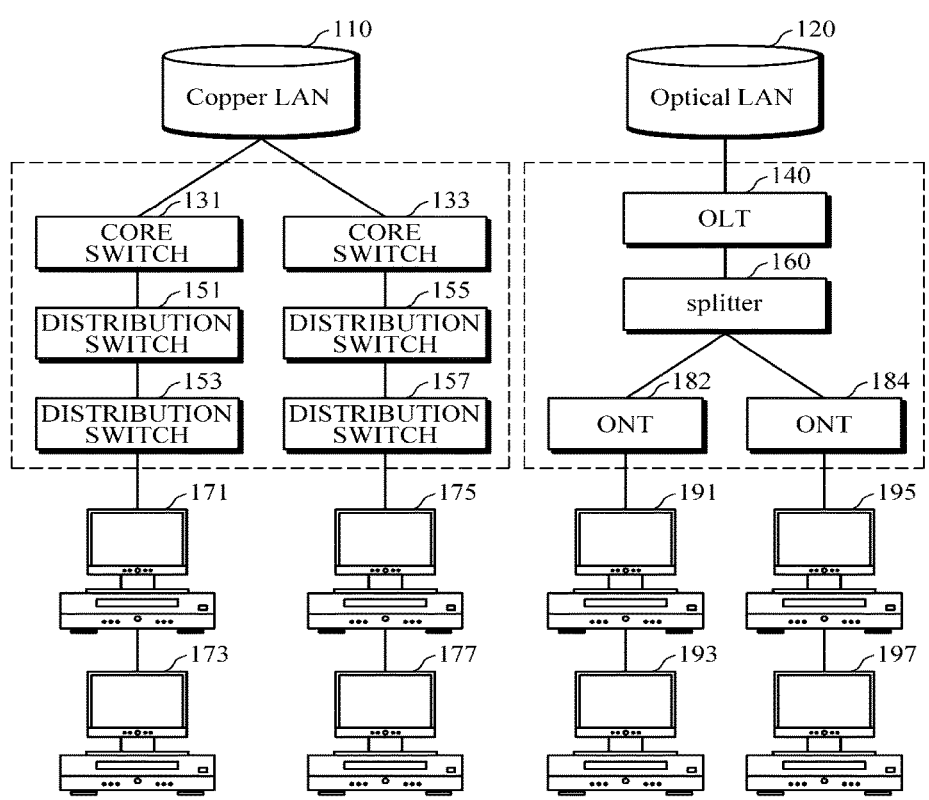
FIG. 1 shows an example copper LAN and an example optical LAN illustrating the proposed inventive concept.

FIG. 1 shows an example copper LAN and an example optical LAN for illustrating the proposed inventive concept. For the example copper LAN on the left side, distribution switches 151, 153, 155, and 157 are connected to core switches 131 and 133 that are connected to an external copper LAN 110. Information processing devices 171, 173, 175, and 177 are connected to ports of the distribution switches. When a virtual chassis concept is applied to the copper LAN, the core switches 131 and 133 and the distribution switches 151, 153, 155, and 157, which are surrounded by dotted lines, are managed similarly to a single switch.

For the example optical LAN on the right side, a plurality of optical network terminals (ONTs) 182 and 184 are connected, in a passive optical network (PON) including a splitter 160, to an optical line terminal (OLT) 140 connected to an external optical LAN 120. Information processing devices 191, 193, 195, and 197 are connected to ports of the ONTs. According to an embodiment of the present invention, the virtual chassis concept is applied to the optical LAN. The OLT 140, the splitter 160, and the ONTs 182 and 184 are managed similarly to a single copper LAN switch. Unlike the copper LAN switch, each device of the optical LAN is managed by the OLT 140 in a centralized manner. According to an aspect, a virtual switch management program is running on the OLT. The virtual switch management program provides a switch management environment for a single chassis-based Ethernet switch with a plurality of port extender cards corresponding to the ONTs and being mounted thereon through a management terminal. The virtual switch management program receives a switch management command through the management terminal and processes a corresponding fiber LAN management command.

Figure 2A:
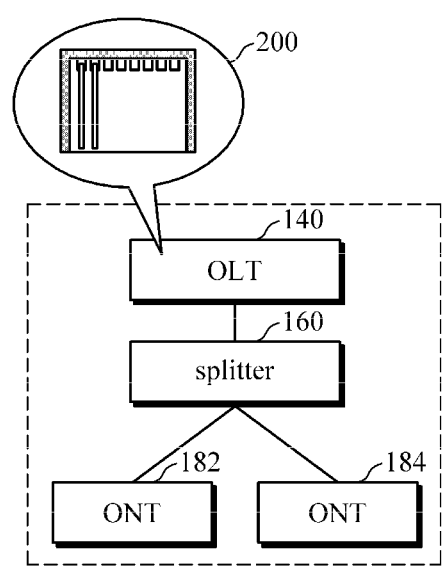
FIGS. 2A and 2B illustrate an example of a logical mapping between an optical LAN and a virtual chassis-based Ethernet switch according to the proposed invention.
Figure 2B:
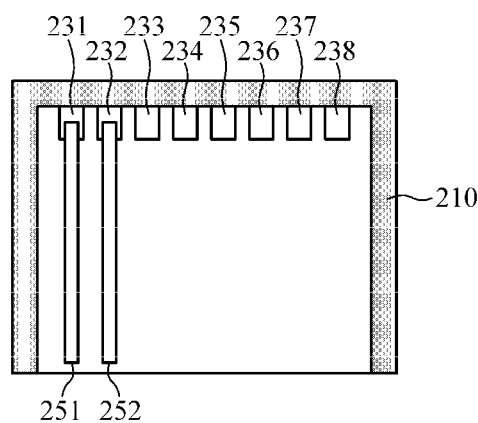

FIGS. 2A and 2B illustrate an example of a logical mapping between an optical LAN and a virtual chassis-based Ethernet switch according to the proposed invention. The optical LAN illustrated in FIG. 1 is shown in FIG. 2A, and a chassis-based Ethernet switch 200 representing the optical LAN is shown in FIG. 2B. As shown, the virtual chassis-based Ethernet switch 200 is implemented in a program running on the OLT 140. For the example optical LAN shown, the OLT is connected to the plurality of ONTs each having a plurality of ports through the PON.

The PON includes the splitter 160 and optical cables. The optical cables connect an output port of the OLT 140 to an input port of the splitter 160 and connect an output port of the splitter 160 to the ONT 182. Although not shown, the optical cable may directly connect the output port of the OLT 140 to the ONT 182. A program that is implemented according to the proposed invention to run on an OLT may represent the OLT 140, the optical communication network, and the ONTs 182 and 184 as a single virtual chassis-based Ethernet switch 200.

In an embodiment, the OLT 140 of the optical LAN corresponds to a chassis 210 of the virtual chassis-based Ethernet switch. In still another embodiment, an optical cable connected to a port of the OLT 140 of the optical LAN, the splitter 160 connected to the cable, and an optical cable connected to an output port of the splitter 160 correspond to slots 231 to 238 of the chassis 210 of the virtual chassis-based Ethernet switch and electrical wires (not shown) installed in the chassis 210 to electrically connect ports of the slots to a control circuit of the chassis 210. The ONTs 182 and 184 connected to the output ports of the OLT 140 through the optical cable and/or the splitter 160 correspond to switch cards, that is, port extenders 251 and 252 according to the proposed invention. Through the port extenders, the ports of the ONTs may be managed as ports of extender cards in the virtual chassis-based switch. The chassis, the electric wires, and the port extenders, which are logical concepts of a chassis-based switch that is virtually present in a virtual switch management module, may be only logically present on program code in an actual environment or may be present as an object managed in a database. According to an aspect, such a virtual management environment is implemented as a program 300 running on the OLT 140.

According to an additional aspect, a virtual chassis-based switch device may include fiber LAN modeling data for modeling a physically present optical LAN. According to an additional aspect, the fiber LAN modeling data may include optical information and configuration information. The optical information is defined to be optical LAN connectivity information. Typically, the optical information includes information regarding serial numbers of the ONTs connected to output ports of the OLT. For example, information such as OLT0/0/ONT1 and OLT0/1/ONT2 may represent that optical network terminal ONT1 is connected to port 0 of optical line terminal OLT0 and optical network terminal ONT2 is connected to port 1 of optical line terminal OLT0. Additionally, the optical information may include optical line speed information.

The configuration information is defined to be information regarding the ONTs corresponding to the port extenders. For example, the configuration information may include information regarding the number of ports and serial numbers of the ONTs corresponding to the port extenders.

According to an aspect, a program that is presented by the proposed invention and is running on the OLT 140 receives switch management commands for a virtual chassis-based switch through a user interface. The program presented by the proposed invention interprets the switch management commands with reference to fiber LAN modeling data and controls the OLT 140 and the ONTs 182 and 184, which are physically present, according to a manager's intention contained in each of the switch management commands.

Figure 3:
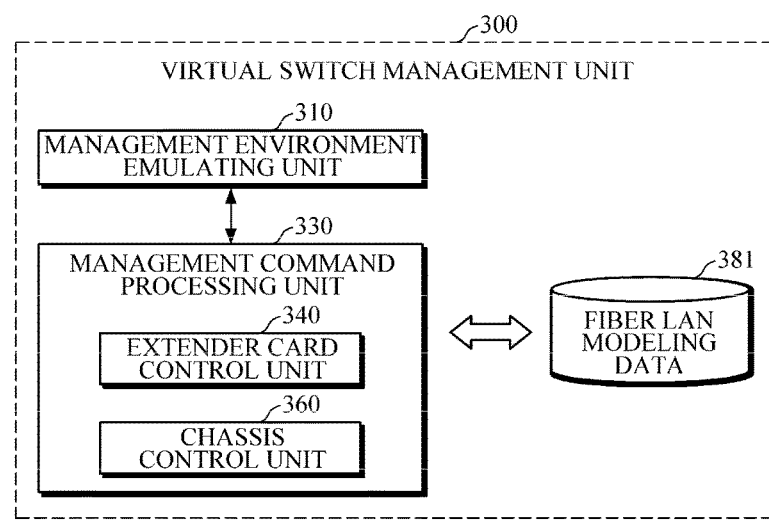
FIG. 3 is a block diagram showing a configuration of a network management program running on an optical line terminal (OLT) according to an embodiment.

FIG. 3 is a block diagram showing a configuration of a network management program running on an OLT according to an embodiment. In the shown embodiment, the OLT includes a memory configured to store a management program and management data and a computing element configured to execute the management program. For example, the computing element may be a single general-purpose processor. In another example, the computing element may refer to one or more network interface integrated circuits, a power control circuit including one or more integrated circuits, a specific application integrated circuit (ASIC) for processing data at high speed, a general-purpose processor, and a system-on-chip (SoC) circuit including a high-speed signal processing integrated circuit.

According to an aspect, the management program includes a virtual switch management unit 300. The virtual switch management unit 300 provides a switch management environment for a single chassis-based Ethernet switch with a plurality of port extender cards corresponding to the ONTs and being mounted thereon through a management terminal. The management data stored in the memory includes information for modeling the optical LAN. The virtual switch management unit 300 may provide, to the manager terminal, a switch management environment that looks like a single virtual switch with reference to the management data. In the shown embodiment, the switch management environment is provided through a command line interface. However, the present invention is not limited thereto, and the switch management environment may be displayed to the manager through a graphic user interface. The switch management environment may be logically applied to a data structure or a management technique. That is, the management terminal follows management items or setting types for the management items of a general chassis-based switch, and the command line interface for the management is provided in a similar form to that of the general chassis-based switch.

The virtual switch management unit 300 receives a switch management command through such a user interface and processes a corresponding fiber LAN management command.

According to still another aspect, the virtual switch management unit 300 of the OLT according to an embodiment may include a management environment emulating unit 310 and a management command processing unit 330. In this embodiment, the management data may include a fiber LAN data model 340. The management environment emulating unit 310 may provide a switch management environment for a single chassis-based Ethernet switch with a plurality of port extender cards being mounted thereon. The port extender cards correspond to the physical ONTs. A user interface is provided to the management terminal through the management environment emulating unit 310, and a switch management command of each port extender is received through the user interface. The management command processing unit 330 processes a management command with reference to management information corresponding to an optical LAN device according to the switch management command. The management command processing unit 330 may specify an OLT or ONT to which a specific switch management command is to be output, with reference to the fiber LAN data model 381.

According to an additional aspect, management data for a virtual chassis-based switch device may include fiber LAN modeling data for modeling a physically present optical LAN. According to a detailed aspect, the fiber LAN modeling data may include optical information and configuration information. The optical information is defined to be optical LAN connectivity information. In view of the virtual chassis-based switch, the optical information may be information regarding wiring between card slots of a virtual chassis itself. In view of the physical optical LAN, the optical information may be information regarding connection of an optical line from the port of the OLT 140 and connection of an optical line from the splitter 160 and its output port. In addition, in view of the optical LAN, the optical information may be information such as whether each port of the OLT has a failure, the speed of an optical line, whether an optical line itself has a failure, and whether the OLT is operating. Typically, the optical information includes information regarding serial numbers of the ONTs connected to output ports of the OLT. For example, information such as OLT0/0/ONT1 and OLT0/1/ONT2 may represent that optical network terminal ONT1 is connected to port 0 of optical line terminal OLT0 and optical network terminal ONT2 is connected to port 1 of optical line terminal OLT0.

The configuration information is defined to be information regarding the ONTs corresponding to the port extenders. For example, the configuration information may include information regarding the number of ports and serial numbers of the ONTs corresponding to the port extenders. In addition, the configuration information may further include name information of the port extenders. By matching the serial number and the name of each port extender, a corresponding ONT and its user may be managed.

According to an aspect, the management command processing unit 330 may further include an extender card control unit 340. The extender card control unit 340 specifies an ONT on the basis of fiber LAN modeling data and parameters included in a switch management command and executes a fiber LAN management command corresponding to the switch management command. The corresponding fiber LAN management command may be one command corresponding to the switch management command or may be a set of commands for processing one function.

In an embodiment, the extender card control unit 340 converts the switch management command into one or a plurality of corresponding fiber LAN management comments. Such commands may be in the form of, for example, a command line interface (CLI). The commands of the CLI form may be classified into commands of recording, changing, or deleting values in a specific field of a modeling DB of a show group for checking information. By using the fiber LAN modeling data, the commands of the CLI form for the chassis-based switch are converted into standard management and control commands for an OLT and an ONT.

Such management and control commands are output through a management and control interface supported by a corresponding ONT. As the management and control interface of the ONT, an ONT management and control interface (OMCI), a simple network management protocol (SNMP), and the like are known. The management and control protocol for the ONT follows these interfaces. The ONTs may support one or more of these interfaces. The extender card control unit 340 outputs a standard fiber LAN management command to a corresponding apparatus according to a protocol of an actual management and control interface.

However, the present invention is not limited to an example in which the switch management command is converted into the fiber LAN management command. For example, by running a plug-in corresponding to the switch management command, a corresponding fiber LAN management and control function may be processed.

According to an aspect, the management command processing unit 330 may further include a chassis control unit 360. The chassis control unit 360 specifies an optical line terminal on the basis of the fiber LAN modeling data and parameters included in the switch management command and executes a corresponding fiber LAN management command. The corresponding fiber LAN management command may be one command corresponding to the switch management command or may be a set of commands for processing one function. For example, in order to disable a specific port extender, the chassis control unit 360 may control a specific output port of the OLT to be deactivated. As another example, in order to disable one port extender for modeling the OLT connected to the splitter, the chassis control unit 360 may directly control a corresponding ONT to be deactivated.

In an embodiment, the chassis control unit 360 converts the switch management command into one or a plurality of corresponding fiber LAN management comments. Such commands may be in the form of, for example, a command line interface (CLI). By using the fiber LAN modeling data, the commands of the CLI form for the chassis-based switch are converted into standard management and control commands for an OLT and a splitter.

Such management and control commands are output through a management and control interface supported by an optical LAN device such as a corresponding OLT or ONT. Such optical LAN devices may support one or more of the above-described standard interfaces. The chassis control unit 360 outputs a standard fiber LAN management command to a corresponding apparatus according to a protocol of an actual management and control interface.

However, the present invention is not limited to an example in which the switch management command is converted into the fiber LAN management command. For example, by running a plug-in corresponding to the switch management command, a corresponding fiber LAN management and control function may be processed.

Figure 4:
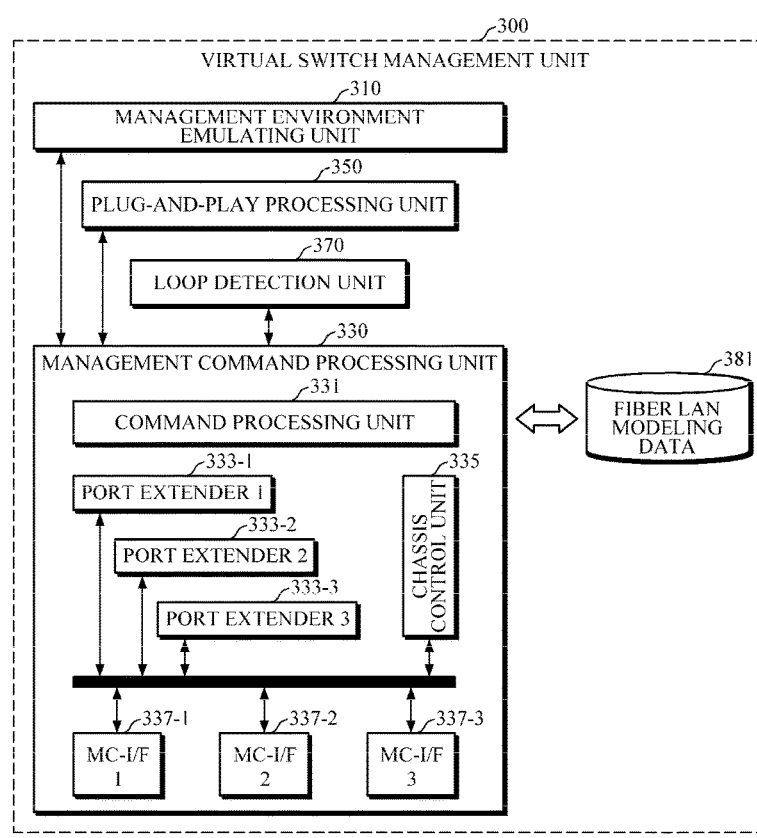
FIG. 4 is a block diagram showing a configuration of a network management program running on an OLT according to another embodiment.

FIG. 4 is a block diagram showing a configuration of a network management program running on an OLT according to still another embodiment. The OLT is connected to the plurality of ONTs each having a plurality of ports through the PON. The OLT includes a memory configured to store a management program and management data and a computing element configured to execute the management program. For example, the computing element may be a single general-purpose processor. In another example, the computing element may refer to one or more network interface integrated circuits, a power control circuit including one or more integrated circuits, a specific application integrated circuit (ASIC) for processing data at high speed, a general-purpose processor, and a circuit including a high-speed signal processing integrated circuit. In the shown embodiment, blocks indicated by the same reference numerals as those in the embodiment shown in FIG. 3 have similar aspects, and thus a description thereof will be omitted.

According to an aspect, the fiber LAN modeling data may further include information regarding types of management and control interfaces of devices constituting the optical LAN. As the management and control interface of the devices constituting the optical LAN, an ONT management and control interface (OMCI), a simple network management protocol (SNMP), and the like are known. The OLT manages the devices constituting the optical LAN by using one or more of the management and control interface standards. The optical LAN devices, including the ONTs, may support one or more of these interfaces.

In the shown embodiment, the management command processing unit 330 includes a plurality of management and control interface modules 337-1, 337-2, and 337-3 and a plurality of port extender plug-in modules 333-1, 333-2, and 333-3. The port extender plug-in modules 333-1, 333-2, and 333-3 and the management and control interface modules 337-1, 337-2, and 337-3 interoperate with one another to specify an ONT on the basis of the fiber LAN modeling data and parameters included in the switch management command and execute a fiber LAN management command corresponding to the switch management command.

In the drawings, three port extender plug-in modules 333-1, 333-2, and 333-3 are shown, but the number of port extender plug-in modules may increase as the number of ONTs connected to the OLT increases. Also, three management and control interface modules 337-1, 337-2, and 337-3 are shown, but the number of management and control interface modules may increase or decrease as the number of management and control protocols supported by each ONT increases or decreases. The management and control interface modules 335-1, 335-2, and 335-3 are interfaced with the ONTs to output a management and control command in their respective ways.

The management and control interface modules 337-1, 337-2, and 337-3 are interfaced with the ONTs to output management and control commands according to their respective interface types. The port extender plug-in modules 333-1, 333-2, and 333-3 specify an ONT on the basis of the fiber LAN modeling data and parameters included in the switch management command and output a corresponding fiber LAN management command through a management and control interface corresponding to a control interface type of the ONT.

In the shown embodiment, a plurality of port extender plug-in modules 333-1 and 333-2 are provided depending on the type of ONT. The port extender plug-in module has the same number of ports as that of the ONT. When the same type of ONT is additionally included, the port extender plug-in module is executed as a new instance according to changed state information of the port extender. The port extender plug-in module outputs a fiber LAN management command to a corresponding ONT according to the changed state information. In this case, the port extender plug-in module outputs the fiber LAN management command through a management and control interface of an ONT with a type defined in a fiber LAN data model. Such commands may be in the form of, for example, a command line interface (CLI). The commands of the CLI form may be classified into commands of recording, changing, or deleting values in a specific field of a modeling DB of a show group for checking information. By using the fiber LAN modeling data, the commands of the CLI form for the chassis-based switch are converted into standard management and control commands for an OLT and an ONT.

According to an additional aspect, the management command processing unit 330 may include a chassis control plug-in module 335 configured to specify an output port of the OLT on the basis of fiber LAN modeling data and parameters included in the switch management command and execute a corresponding fiber LAN management command. In this embodiment, the chassis control unit 335 of the management command processing unit 330 deactivates a specific port of the OLT or blocks input/output of the OLT so that the chassis control plug-in module 335 may disable or evenly separate a specific port extender in or from the chassis-based switch, for example, as instructed by the management environment emulating unit 310.

According to an additional aspect, the management command processing unit 330 may further include a plurality of management and control interface modules 337-1, 337-2, and 337-3 and a chassis control plug-in module 335. The plurality of management and control interface modules 337-1, 337-2, and 337-3 are similar to those described above. The chassis control plug-in module 335 specify an ONT on the basis of the fiber LAN modeling data and parameters included in the switch management command and output a corresponding fiber LAN management command through a management and control interface corresponding to an interface type of the ONT. Since it is typically impossible to remotely control the splitter by using passive equipment, a connected ONT is directly controlled. In this embodiment, in order to disable one port extender for modeling an OLT connected to a splitter in a chassis-based switch, for example, as instructed by the management environment emulating unit 310, the chassis control plug-in module 335 may control the ONT itself to be deactivated.

When a new ONT is connected, a new instance of the port extender plug-in module is executed. Also, when a splitter is connected to a port of the OLT and new ONTs are connected to the splitter, new instances of the port extender plug-in module and also a new instance of the chassis control plug-in module may be executed.

According to another aspect, management data may further include switch state data including state information of each port extender. In view of the virtual chassis-based switch, the state information may be information regarding whether port extenders identified by their own serial numbers are physically connected, whether the port extenders are temporarily registered when the port extenders are physically connected, whether the port extenders are activated, and the like. Similarly, in view of the physical ONT, the state information may be information regarding whether the ONT is physically connected, whether the ONT is activated, and the like.

In an embodiment, the state of a port extender or the state of UNI interfaces of the port extender may have a value of any one of an auto-provisioned mode and a pinned mode. In the auto-provisioned mode, when a port extender is or the UNIs are activated, but an ONT corresponding to the port extender is not physically installed or is deactivated, all the UNIs of the port extender are removed from the switch. However, in the pinned mode, when the ONT corresponding to the port extender is not physically installed or is deactivated, all the UNIs of the port extender are deactivated, but not removed.

According to an additional aspect, the management program may further include a plug-and-play processing unit 350 configured to, when a new ONT is connected to an optical line, detect the new ONT and generate a fiber LAN data model of a new port extender having the same number of ports as that of the connected ONT in the fiber LAN data model. In this case, the state information of the new port extender may be set to the "auto-provisioned mode" by a set of connection processing instructions.

In an embodiment, the plug-and-play processing unit 350 is implemented as a processing that is always running on the memory. When a new ONT is connected, the OLT detects the connected ONT, and the plug-and-play processing unit 350 senses the connected ONT from the control process of the ONT through the management and control interface module 337. This may be implemented by receiving a message conforming a management and control interface standard from the new ONT. In order to provide a management environment of the virtual chassis-based switch, the plug-and-play processing unit 350 generates a port extender having a UNI interface corresponding to the new ONT. By setting state information of a connected port extender to the "auto-provisioned mode," the new port extender or the ONT is ready for operation. In this case, however, when the state information is not changed to the "pinned mode," and the ONT is also physically removed, the new port extender is deleted from the fiber LAN data model.

According to an additional aspect, the management program may further include a loop detection unit 370. The loop detection unit 370 detects whether a loop is present in a network of connected ONTs, and for example, transmits a warning message to the management terminal. Generally, ONTs have a function of checking whether the loop is present. By adding this function to the OLT, it is possible to simplify an ONT.

A command processing control unit 331, which has not been described herein, is a control process for executing instances of port extender plug-in or chassis control plug-in on the basis of switch management commands from the management environment emulating unit 310.

Figure 5:
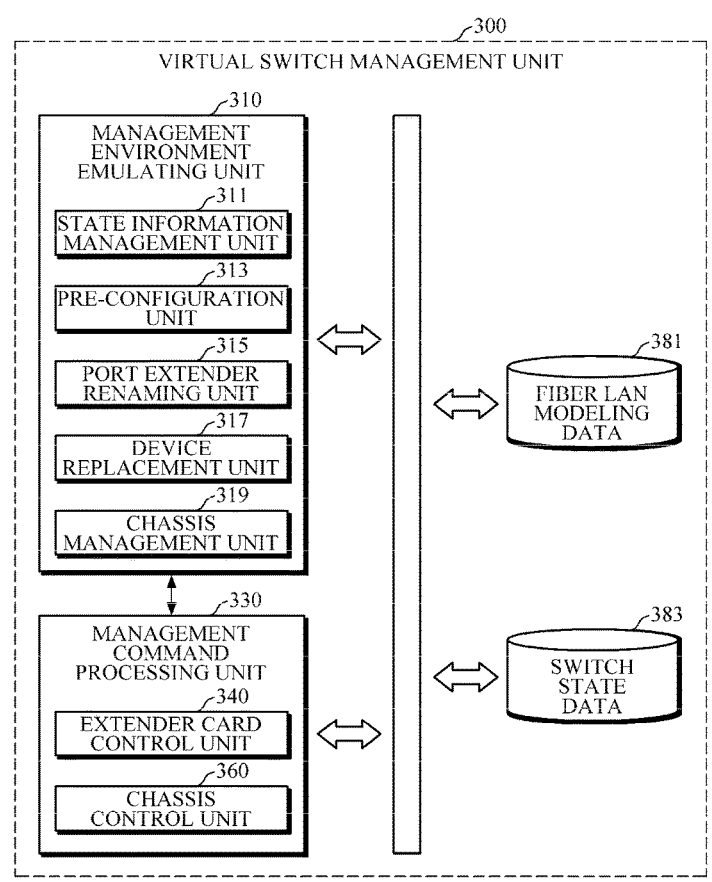
FIG. 5 is a block diagram showing a configuration of a network management program running on an OLT according to still another embodiment.

FIG. 5 is a block diagram showing a configuration of a network management program running on an OLT according to still another embodiment. The shown embodiment proposes a detailed embodiment of the management environment emulating unit 310. According to an additional aspect, the management environment emulating unit 310 may further include a state information management unit 311 configured to change or inquire about state information of each port extender included in the fiber LAN data model according to the switch management command. In view of the virtual chassis-based switch, the state information may be information regarding whether port extenders identified by their own serial numbers are physically connected, whether the port extenders are in an auto-provisioned mode in which the port extenders are physically connected but temporarily registered or in a pinned mode, and the like. Similarly, in view of the physical ONT, the state information may be information regarding whether the ONT is physically connected, whether the ONT is activated, and the like. For example, the state information management unit 311 may have a function of changing a serial number of a port extender when the number of the port extender is changed or when the device is replaced.

For example, through a command "show", it is possible to change states of the port extender or states of a specific port extender and its UNIs. For example, through a command "show port-extender", it is possible to check the names, serial numbers (SN), and states of all the port extenders, as follows.

| PORT EXTENDER NAME | DEVICE SN | PINNED | ACTIVE | BLACK-LISTED |
|---|---|---|---|---|
| ZNTS0363618a | ZNTS0363618a | No | Yes | No |
| ZNTS03635d24 | ZNTS03635d24 | No | Yes | No |

-continued

| PORT EXTENDER NAME | DEVICE SN | PINNED | ACTIVE | BLACK-LISTED |
|---|---|---|---|---|
| ZNTS006f4550 | ZNTS006f4550 | No | Yes | No |
| ZNTS006f4546 | ZNTS006f4546 | No | Yes | No |

As another example, through a command "show interface status," it is possible to check the UNI states of the port extenders, as follows.

| Interface | TYPE | STATUS (ADMIN/OPER) | MODE | FLOWCTRL (ADMIN/OPER) |
|---|---|---|---|---|
| ZNTS0363618a/1 | Ethernet | Up/Up | Force/Full/1000 | Off/Off |
| ZNTS0363618a/2 | Ethernet | Up/Up | Force/Full/1000 | Off/Off |
| ZNTS0363618a/3 | Ethernet | Up/Up | Force/Full/1000 | Off/Off |
| ZNTS0363618a/4 | Ethernet | Up/Up | Force/Full/1000 | Off/Off |

According to an additional aspect, the management environment emulating unit 310 may include a pre-configuration unit 313 configured to generate a fiber LAN data model of a new port extender according to port interface information (UNI interface) input from a manager. The pre-configuration function is a function of manually setting a device serial number and a port extender name prior to activating an ONT. Thus, it is possible to control a UNI interface of a specific ONT, and a user may use a UNI of an ONT as if using a general port of a copper LAN switch. According to an additional aspect, such a pre-configured port extender may set initial state information to the "pinned mode." According to such an alternative aspect, the settings are recorded in a permanent memory so that the settings may be maintained even after new booting. For example, the pre-configuration command may be configured to be "port-extender ZNTS0363618a name swlab." The command in the command line interface (CLI) form registers a new port extender having a serial number "ZNTS0363618a" and a name "swlab." When the command "show," which is for checking the state of the port extender, is detected, it can be seen, through a result such as "port-extender ZNTS0363618a name swlab state pinned" that the state of the port extender is set to the pinned mode.

According to an additional aspect, the management environment emulating unit 310 may further include a port extender renaming unit 315 configured to change a name in a fiber LAN data model of a port extender according to an input from a manager. A name may be assigned to the port extender such that the manager can easily remember the name. For example, the name of a port extender may be a position name capable of identifying a group or an individual who frequently uses the port extender. In an embodiment, when the state of the port extender is either the auto-provisioned mode or the pinned mode, the port extender may be renamed.

For example, while a port extender "ZNTS0363618a" has a name "swlab" in the pinned mode, the following port extender renaming command may be executed.

change serial ZNTS0363618a new-name NEW_swlab

Through this command, the old name "swlab" is changed to a new name "New_swlab." When the command "show" for checking the state of the port extender is detected, it can be seen that the port extender "ZNTS0363618a" is renamed while the pinned mode is maintained, as follows.

port-extender ZNTS0363618a name NEW_swlab state pinned

According to an additional aspect, the management environment emulating unit 310 may further include a device replacement unit 317 configured to change a device serial number of a port extender according to an input from a manager but to maintain port interface information of the port extender. When an ONT is replaced under any circumstance, the ONT is usually replaced with a device having the same model as the particular ONT. In this case, it is convenient for the manager to change only the device serial number so that he or she does not need to reset the name or the state information. The function of changing the serial number may be performed regardless of whether a new device is connected.

According to an additional aspect, the virtual switch management unit 300 may further include a chassis management unit 319. The chassis management unit 319 receives a switch management command for the chassis of the virtual chassis-based switch. The switch management command for the chassis of the virtual chassis-based switch is delivered to the chassis control unit 360. The chassis control unit 360 may execute a fiber LAN management command corresponding to an ONT or a port of a corresponding OLT. For example, the chassis management unit 319 may check a bus state of a card holder. Physically, the checking may correspond to checking a state of a specific port of the OLT. As still another example, the chassis management unit 319 may deactivate a specific slot or card holder in the chassis. Physically, this deactivation may correspond to disconnecting an ONT connected to a specific output port of the splitter.

According to an additional aspect, the state information of the port extender may include a black-listed mode. In this case, the management environment emulating unit 310 may allow only limited processing of a port extender being in the black-listed mode other than port extenders being in other states. By using the black-listed mode, it is possible to limit operation of an ONT that should be excluded from the network even when the ONT is physically connected and registered in the auto-provisioned mode through the plug-and-play function or the like. For example, in the black-listed mode, it is possible to limit the management function such that a port extender may only be renamed or removed. In addition, the black-listed mode is recorded in a permanent memory and thus maintained although the apparatus is rebooted.

The present invention has been described above with reference to embodiments referring to the accompanying drawings, but is not limited thereto. Rather, the present invention should be construed as encompassing various modifications that may be apparent to those skilled in the art. The described aspects may be freely combined without contradiction, and such combinations are also included in the scope of the present invention.

Figure 6:
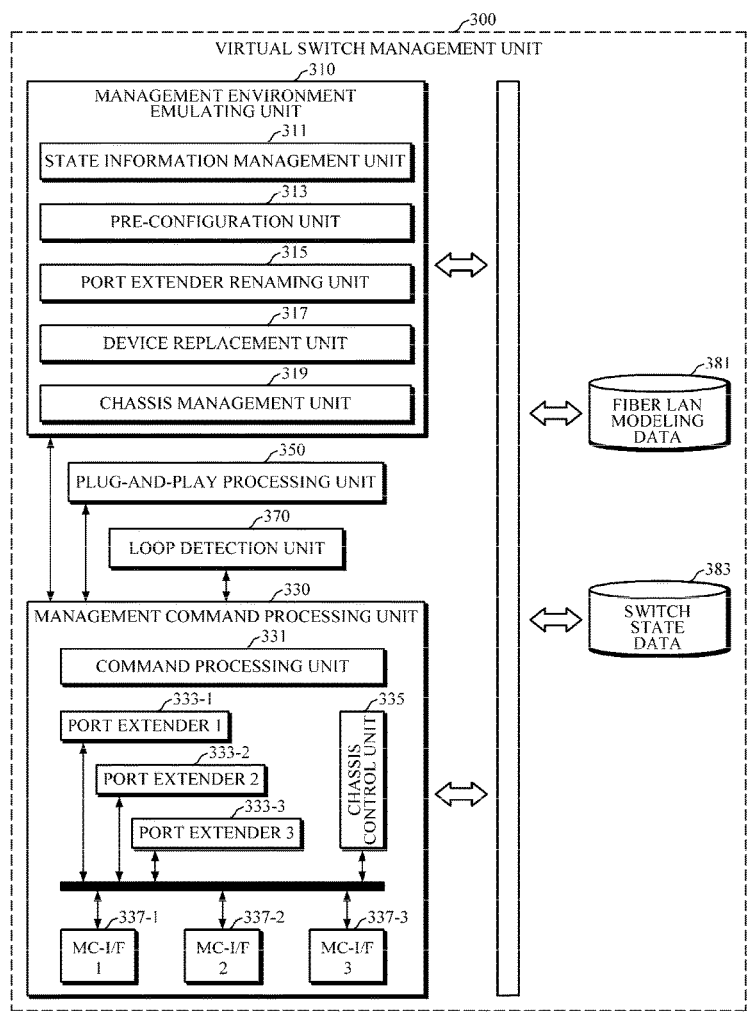
FIG. 6 is a block diagram showing a configuration of a network management program running on an OLT according to yet another embodiment.

FIG. 6 is a block diagram showing a configuration of a network management program running on an OLT according to yet another embodiment in which the aspects of the FIG. 4 are combined with the aspect of FIG. 5. Obviously, blocks of the management environment emulating unit 310 indicate aspects that are not mutually exclusive and may be combined independently. The aspects presented by the plug-and-play processing unit 350 or the loop detection unit 370 also indicates aspects that are not exclusive to the blocks of the management environment emulating unit 310 and may be combined independently. The aspects of the management command processing unit 330 are merely technical examples presented by the proposed invention and can be implemented in other modified ways that may be obviously derived. The appended claims are intended to cover such combinations and omitted or simplified embodiments, but the present invention do not claim all such combinations, and the combinations should be allowed to fall into the scope of the present invention through future amendments.

According to the proposed invention, a network manager may manage an optical LAN in the same management way as that of a copper LAN switch that is familiar to him or her.

According to the proposed invention, a network manager may manage a complicated optical LAN in the same management way as that of a copper LAN switch that is familiar to him or her.

Furthermore, according to the proposed invention, it is possible to simplify an optical network terminal (ONT) and facilitate addition of a new function in managing an optical LAN.

Accordingly, the embodiment and the accompany drawings of the present invention are to be considered descriptive and not restrictive of the invention, and do not limit the technical scope of the invention. The scope of the invention should be to be construed by the appended claims, and all technical ideas within the scope of their equivalents should be construed as being included in the scope of the invention.

What is claimed is:

1. An optical line terminal having a plurality of ports and constituting an optical local area network (LAN) with a plurality of optical network terminals connected to the plurality of ports through a passive optical network (PON), the optical line terminal comprising:
    a memory configured to store a management program and management data; and
    a computing element configured to execute the management program,
    wherein the management program includes a set of virtual switch management instructions for providing a switch management environment for a single chassis-based Ethernet switch with a plurality of port extenders corresponding to the optical network terminals and being mounted thereon through a manager terminal, for receiving a switch management command, and for processing a corresponding fiber LAN management command,
    wherein the management data includes a fiber LAN modeling data, and
    wherein the management program further comprises:
    a set of management environment emulating instructions for providing the switch management environment for the single chassis-based Ethernet switch with the plurality of port extenders corresponding to the optical network terminals and being mounted thereon depending on fiber LAN modeling data and for receiving a switch management command for each of the port extenders; and
    a set of management command processing instructions for a fiber LAN management command corresponding to actual physical fiber LAN devices.

2. The optical line terminal of claim 1, wherein the fiber LAN modeling data comprises:
    optical information including optical LAN connectivity information; and
    configuration information including serial numbers of the port extenders and the number of ports.

3. The optical line terminal of claim 2, wherein the set of management command processing instructions comprises a set of extender card control instructions for specifying an optical network terminal on the basis of the fiber LAN modeling data and parameters included in the switch management command and executing a fiber LAN management command corresponding to the switch management command.

4. The optical line terminal of claim 3, wherein the fiber LAN modeling data further comprises information regarding types of management and control interfaces of devices constituting the optical LAN.

5. The optical line terminal of claim 4, wherein the set of management command processing instructions includes a plurality of management and control interface modules interfaced with the optical network terminals and configured to output management and control commands according to different interface types and a plurality of port extender plug-in modules configured to specify an optical network terminal from the fiber LAN modeling data and parameters included in the switch management command and output a corresponding fiber LAN command through a management and control interface according to a control interface type of the optical network terminal.

6. The optical line terminal of claim 5, wherein the management program further comprises a set of plug-and-play processing instructions for, when a new optical network terminal is connected to an optical line, detecting the new optical network terminal through the management and control interface modules and generating a fiber LAN data model of a new port extender with the same number of ports as that of the new optical network terminal in a fiber LAN data model.

7. The optical line terminal of claim 6, wherein the set of plug-and-play processing instructions further comprises a set of connection processing instructions for setting state information of the new port extender to an auto-provisioned mode.

8. The optical line terminal of claim 4, wherein the set of management command processing instructions comprises a chassis control plug-in module configured to specify an output port of the optical line terminal on the basis of the fiber LAN modeling data and parameters included in the switch management command and configured to execute a corresponding fiber LAN management command.

9. The optical line terminal of claim 4, wherein the set of management environment emulating instructions further comprises a set of state information management instructions for changing or inquiring about state information of the port extenders with reference to switch state data according to the switch management command.

10. The optical line terminal of claim 4, wherein the set of management environment emulating instructions further comprises a set of pre-configuration instructions for generating a fiber LAN data model of a new port extender according to port interface information (UNI interface) received from a manager and setting state information to a pinned mode.

11. The optical line terminal of claim 4, wherein the set of management environment emulating instructions comprises a set of port extender renaming instructions for changing a name of each of the port extender in the fiber LAN data model according to an input from a manager.

12. The optical line terminal of claim 4, wherein the set of management environment emulating instructions comprises a set of device replacement instructions for changing device serial numbers of the port extenders according to an input from a manager and maintaining port interface information of the port extenders.

13. The optical line terminal of claim 4, wherein state information of the port extenders includes a black-listed mode, and the set of management environment emulating instructions allows only limited processing of a port extender being in the black-listed mode other than port extenders being in other states.

14. The optical line terminal of claim 2, wherein the set of management command processing instructions comprises a set of chassis control instructions for specifying an optical line terminal or an optical network terminal on the basis of the fiber LAN modeling data and parameters included in the switch management command and executing a fiber LAN management command corresponding to the switch management command.

15. The optical line terminal of claim 2, wherein the management data further comprises switch state data including state information that includes state information of the port extenders.

16. The optical line terminal of claim 1, wherein the management program further comprises a set of loop detection instructions for detecting whether a loop is present in a network of the connected optical network terminals and transmits a warning message.

17. The optical line terminal of claim 1, wherein the set of management environment emulating instructions further comprises a set of chassis management instructions for receiving a switch management command for a switch chassis and making an instruction to output a fiber LAN management command to a corresponding port of the optical line terminal.

* * * * *